(12) United States Patent
Vu

(10) Patent No.: US 7,285,603 B2
(45) Date of Patent: Oct. 23, 2007

(54) PRIMER-LESS ABRASION COATING FOR ORGANIC GLASS ARTICLES

(75) Inventor: Hannah Vu, New Brighton, MN (US)

(73) Assignee: Insight Equity A.P.X., L.P., Ramsey, MN (US)

( * ) Notice: Subject to any disclaimer, the term of this patent is extended or adjusted under 35 U.S.C. 154(b) by 0 days.

(21) Appl. No.: 11/103,373

(22) Filed: Apr. 11, 2005

(65) Prior Publication Data

US 2005/0238882 A1    Oct. 27, 2005

Related U.S. Application Data

(60) Provisional application No. 60/561,111, filed on Apr. 9, 2004.

(51) Int. Cl.
*B32B 27/00* (2006.01)
*B32B 27/38* (2006.01)
*C08L 63/00* (2006.01)

(52) U.S. Cl. ............... 525/523; 106/287.16; 428/412; 428/413; 428/415; 428/447

(58) Field of Classification Search .............. None
See application file for complete search history.

(56) References Cited

U.S. PATENT DOCUMENTS

| | | | | | |
|---|---|---|---|---|---|
| 4,378,250 | A | * | 3/1983 | Treadway et al. | ..... 106/287.11 |
| 4,405,679 | A | * | 9/1983 | Fujioka et al. | ............. 428/216 |
| 5,902,847 | A | * | 5/1999 | Yanagi et al. | ............... 524/300 |
| 6,072,008 | A | * | 6/2000 | Matsuno et al. | ......... 525/330.3 |
| 7,018,463 | B2 | * | 3/2006 | Terry | .................... 106/287.13 |

FOREIGN PATENT DOCUMENTS

| | | | | |
|---|---|---|---|---|
| JP | 51-42770 | A | * | 4/1976 |
| JP | 54-67000 | A | * | 5/1979 |
| JP | 59-15457 | A | * | 1/1984 |
| JP | 61-26638 | A | * | 2/1986 |
| JP | 61-44932 | A | * | 3/1986 |

* cited by examiner

*Primary Examiner*—Robert Sellers
(74) *Attorney, Agent, or Firm*—Inskeep IP Group, Inc.

(57) ABSTRACT

The present invention provides a method for improving adhesion of polyorganosiloxane to plastic, such as polycarbonate substrates. In a preferred embodiment, a tertiary amine is added to a polyorganosiloxane coating composition to achieve an improved abrasion coating.

14 Claims, No Drawings

PRIMER-LESS ABRASION COATING FOR ORGANIC GLASS ARTICLES

RELATED APPLICATIONS

This application claims priority to U.S. Provisional Application Ser. No. 60/561,111 filed Apr. 9, 2004 entitled Primer-less Abrasion Coating For Polycarbonate Articles and is hereby incorporated by reference.

FIELD OF THE INVENTION

The present invention generally relates to a method and a coating composition that have improved adhesion to plastic substrates, and more particularly, to a method of improving adhesion of a polyorganosiloxane coating composition by adding a tertiary amine into the coating without the need to use a primer on the plastic substrate.

BACKGROUND OF THE INVENTION

The trend to substitute glass with other transparent plastics, also known as organic glass, has become widespread. Transparent windows are now utilized in transportation vehicles which have higher impact and shatter resistance due to the use of this synthetic organic glass. Optical lenses and especially ophthalmic eyeglasses often use organic glass to obtain lightweight, yet high impact resistant lenses.

One widely used transparent material is the thermoplastic polycarbonate such as Lexan® sold by General Electric Company, which provides major advantages over ordinary glass such as impact resistance, light weight and high refractive index. Polycarbonate has become widely used to replace glazing glass in transportation vehicles, building windows and optical lenses such as ophthalmic eyeglasses. One major drawback of polycarbonate is that the material is easily scratched and therefore typically requires surface protection for articles made from such polycarbonates.

Polycarbonate substrates are usually coated with a thin protective film to reduce their tendency to be abraded, resist corrosion, and to provide a sacrificial surfaces. It is also generally desirable that protective coatings have good weathering and adhesion properties. It is also desirable that such coatings be resistant to thermal shock, mechanical shock, heat, humidity, and common chemicals. In addition, the coatings must be practical to prepare, apply, dry, and cure.

Much effort has been exerted in this field, and several different technical approaches have been described. In particular, work has been carried out on the development of polyorganosiloxanes crosslinked by the condensation of silanol groups. The coatings described by the prior art, however, have numerous drawbacks such as poor adhesion or short pot life.

It is known in the art that polyorganosiloxane coating compositions with a basic pH such as those with amine functional compounds may have improved adhesion to plastic substrates. The resulting coating solutions, however, tend to increase viscosity over time and have a relatively short pot life. Pot life is known in the art as the time interval between completely mixing the coating elements together and the time when the coating solution becomes too viscous to satisfactorily apply. In some circumstances, the pot life is known in the art as the gel time, or the time interval between complete mixing of the coating solution and gelation of the coating solution.

It is also known in the art that polyorganosiloxane coating compositions with an acidic pH, especially from pH of 3 to 5, result in more stable coating solutions. However, the application of such coatings to plastic substrate often requires the use of a primer prior to application of the coatings.

Some of these techniques can be seen in the prior art patents discussed below. The contents of each of these patents are herein incorporated by reference.

Mayazumi, in U.S. Pat. No. 3,837,876, describes a polymer formed by reacting an aminosilane with an epoxysilane, dissolving the resulting product in a solvent, and then coating various substrates with the solution of the product. Ender, in U.S. Pat. No. 3,166,527, describes the mixing of an epoxysilane with an aminosilane, then coating surfaces with both the unreacted mixture and the reacted (partially polymerized) mixture. The coating is cured by standing at room temperature for a longer period of time or by heating for a shorter period of time. The coatings described, however, would gel at room conditions within hours.

Treadway and Carr, in U.S. Pat. No. 4,378,250, describe the use of aldehydes or ketones as blocking agents in polymeric compositions derived from certain aminosilanes and epoxysilanes. The reference also describes the nuance of increasing the hydrolysis of the silanes to above 40%. The reference describes greater abrasion resistance in the cured product and longer pot life in the curable composition because of the presence of the ketone acting to retard the reaction between the amine functionality and the epoxy functionality on the various reactants. However, the coating solution still gels within a short time, for example a few days. Further, the required method of preparation can be long and is further restricted by a limited dye tintability range that can be obtained by varying the ratio of epoxy to amino within the bounds of the compositions described for attaining the desired level of abrasion resistance. Replication of these compositions shows crosslink equivalent weights of at least about 173 when fully cured.

U.S. Pat. No. 6,057,040 describes an alkine bridged bis-aminosilanes that may form a crosslinked polymeric coating. At least one of the polymerizable compounds comprises an alkine-bridged bis-(aminosilane) and another preferred polymerizable compound in the composition comprises an epoxy-functional silane. The coatings provided from these compositions are highly crosslinked and therefore display excellent mar resistance as well as increased tintability. As noted in the art, this combination is unusual since where one of these properties increases, it is done at the expense of the other property.

U.S. Pat. No. 6,346,331 B2 describes an epoxy bridged polyorganosiloxane coating compositions containing a glycidoxy functional silane, a tetrafunctional silane and a multi-functional organic compounds selected from the group consisting of multifunctional carboxylic acids, multifunctional anhydrides and combinations thereof. The coatings provided from these compositions have excellent abrasion resistance. However, these coatings do not adhere to polycarbonate substrates and therefore require the use of a primer prior to the application of the coatings.

U.S. Pat. No. 6,607,590 describes an organic-inorganic hybrid polymer arising from tetraalkyl orthosilicate, epoxyalkylalkoxy silanes, (math)acryaloxyalkylalkoxy silanes and solvent, coatings made from those coating compositions, and articles made from these coatings. The coatings have high scratch resistance based on a Bayer test. However, these coatings are described as not providing satisfactory adhesion to high index and polycarbonate lens materials. An activator or primer is typically required to apply these coatings to high index and polycarbonate lens material.

Other U.S. Pat. Nos. 3,976,497, 3,9886,997, 4,027,073 described mar-resistant coating compositions formed from mixtures of silica, such as colloidal silica or silica gel, and hydrolyzable silanes such as alkoxy silanes in water or alcohol medium. These polysilicic coatings, especially when acidic, don't have good adhesion to many plastic, especially polycarbonate substrates.

In U.S. Pat. No. 4,413,979 Frye suggests the use of aggressive solvents such diacetone alcohol to improve adhesion. The solvents, however, are typically not sufficient to provide adequate adhesion to some plastic materials such as polycarbonate.

U.S. Pat. No. 4,783,347 introduced a method to improve adhesion of protective silicone coatings to plastic without the use of primers by shock curing the coated substrates at a temperature not substantially below 140 C. The shock curing temperature, however, is very close to the glass transition temperatures (Tg) of many plastic materials. For example polycarbonate has Tg of 150 C. The shock curing then can affect the optical properties of the articles produced and optical applications are where polycarbonate is used most.

It is an unexpected result to the inventor that when adding tertiary amines into polyorganosiloxan coating compositions at acidic conditions, the adhesion of the coating to many plastic, especially polycarbonate substrates, are improved substantially. The resulting coating solutions, however, still have sufficient pot lives. The presence of the tertiary amines also increases abrasion and scratch resistance of the resulted coatings.

OBJECTS AND SUMMARY OF THE INVENTION

One object of the present invention is to provide a method to improve adhesion of polyorganosiloxane coating compositions to polycarbonate while maintaining the pot life of the coating solution.

It is a further object of the present invention to improve the scratch resistance of the polyorganosiloxane coatings.

The above and other objectives are accomplished by the current invention herein in which one or more tertiary amines are added into a coating composition comprising sol gel mixtures of one or more of glycidoxy functional silanes, tetraalkoxy silanes, colloidal silica and organic multi-functional epoxy compounds, said coating compositions containing 1 to 40% solid consisting 30-70% of glycidoxy functional silanes and 30-70% of total tetraalkoxy silanes and colloidal silica. Additionally, the coating compositions also include an effective amount of compatible solvents and water, a small but effective leveling agent, and optionally a small but effective catalyst.

BRIEF DESCRIPTION OF THE DRAWINGS

No accompanying figures are presented.

DETAILED DESCRIPTION OF THE INVENTION

A thin film composition in accordance with the present invention application is prepared by mixing glycidoxy functional silane, tetra alkoxysilane, multi-functional organic epoxies, water, organic solvents and a small but effective quantity of an acid to catalyze the hydrolysis reactions of the alkoxy silanes.

The mixture first appears inhomogenous and cloudy. Continuing mixing brings in a clear, homogenous solution when the hydrolysis of the silanes starts. The mixing is then continued for 8 to 16 hours, sometimes proceeding overnight, until the hydrolysis reaction is completed. Next, a small but effective amount of a leveling agent and one or more tertiary amines are added into the solution and continually mixed until a final homogenous coating solution is obtained. It is preferred that the total amount of the tertiary amine(s) is from about 0.05 to 3.0% by weight of the total coating solid, and more preferably from about 0.1 to 2.0% by weight of total coating solid. Most preferably, the total amount of tertiary amines is from about 0.2 to 1.0% by weight of the total coating solid.

Glycidoxy Functional Silanes

In a preferred embodiment according to the present invention a glycidyl- or glycidoxy-functional silane may be described by the formula:

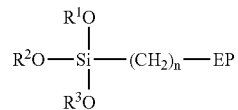

wherein $R^1$, $R^2$, and $R^3$ are independently selected from hydrogen, aliphatic groups or aromatic groups which complete a siloxane on the silicon (Si) atom, preferably alkyl groups, benzyl groups or phenyl groups, and more preferably unsubstituted alkyl groups;

n is an integer from 1 to 4, and;

EP represents a glycidyl (e.g., glycidoxy) group.

It is well recognized within the art that some substitution of the compounds used in forming the compositions is not only tolerable, but in some instances highly desirable. Where the term "group" is used to refer to a substitutent or nucleus, that term is specifically inclusive of both substituted and unsubstituted substituents or nuclei. For example, the term "alkyl group" refers to not only the pure hydrocarbon within the definition of alkyl (e.g., methyl, ethyl, octyl, isooctyl, dodecyl, etc.), but also those materials within the art recognized as substituted alkyls, such as monosubstituted haloalkyl, hydroxyalkyl, ether groups (e.g., —CH$_2$—O—CH$_2$—, etc.), and the like. Where the chemical group is used without description of a group or described as a moiety, such as with ethyl or hexyl moiety, or decyl, that phrase excludes substitution.

Examples of glycidyl- or glycidyl-functional silanes include glycidyl methyl trimethoxysilane, glycidoxy methyl triethoxysilane, 2-glycidoxyethyltrimethoxysilane, 2-glycidoxyethyltriethoxysilane, 1-glycidoxyethyltrimethoxysilane, 1-glycidoxyethyltriethoxysilane, 3-glycidoxypropyltrimethoxysilane, 3-glycidoxypropyltriethoxysilane, 2-glycidoxypropyltrimethoxysilane, 2-glycidoxypropyltriethoxysilane, 1-glycidoxypropyltrimethoxysilane, 1-glycidoxypropyltriethoxysilane, 4-glycidoxybutyltrimethoxysilane, 4-glycidoxybutyltriethoxysilane, 3-glycidoxybutyltrimethoxysilane, 3-glycidoxybutyltriethoxysilane, 2-glycidoxybutyltrimethoxysilane, 2-glycidoxybutyltriethoxysilane, 1-glycidoxybutyltrimethoxysilane, 1-glycidylbutyltriethoxysilane, 2-glycidoxyethylmethyltrimethoxysilane, 2-glycidoxyethylmethyltriethoxysilane, 1-glycidoxyethylmethyltrimethoxysilane, 1-glycidoxyethylmethyltriethoxysilane, 3-glycidoxypropylmethyltrimethoxysilane, 3-glycidoxypropylmethyltriethoxysilane, 2-glycidoxypropylmethyltrimethoxysilane, 2-glycidoxypropylmethyltriethoxysilane, 1-glycidoxypropylmethyltrimethoxysilane, 1-glycidoxypropylmethyltriethoxysilane.

In a preferred embodiment of the current invention, the quantity of glycidyl- or glycidoxy-functional silane is from 20 to 80% by weight of the total coating solid, and more preferably from 30 to 70% by weight of the total coating solid.

Tetralkoxysilanes

In a preferred embodiment according to the present invention, tetraalkoxysilanes include compounds of the formula:

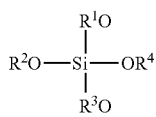

wherein $R^1$, $R^2$, $R^3$ and $R^4$ are independently selected from hydrogen, aliphatic groups or aromatic groups which complete a siloxane on the silicon (Si) atom, preferably alkyl groups, benzyl groups or phenyl groups, and more preferably unsubstituted alkyl groups;

Examples of tetraalkoxysilanes include tetramethoxysilane, tetraethoxysilane, tetraacetoxysilane, tetraisocyanatosilane, tetraallyloxysilane, tetra-n-propoxysilane, tetrabutoxysilane, tetrakis-(2-n-butoxyethoxy)silane, tetrakis(2-ethoxyethoxy)silane, tetrakis(2-ethylbutoxy)silane, tetrakis(2-ethylheloxy)silane, tetrakis(methoxyethoxyethoxy)silane, tetrakis(2-methoxyethoxy)silane and tetrakis(1-methoxy-2-propoxy)silane.

In a preferred embodiment of the current invention, the quantity of tetraalkoxysilane is from 20 to 80% by weight of the total coating solid, and more preferably from 30 to 70% of the total coating solid by weight.

Tertiary Amines

A preferred embodiment of the present invention includes tertiary amines having the general formula:

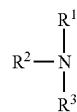

wherein $R^1$, $R^2$, and $R^3$ are independently selected from hydrogen, aliphatic groups or aromatic groups which complete the covalent bonds on the nitrogen (N) atom, preferably alkyl groups, substituted alkyl groups, benzyl groups or phenyl groups, and more preferably unsubstituted alkyl groups and alcohol substituted alkyl groups.

The preferred tertiary amines used in the invention have a molecular weight higher than 100, more preferably from 100 to 490. Adding a tertiary amine with a small molecular weight can result in a coating solution with a short pot life. In a preferred embodiment of the present invention, a tertiary amine with a molecular weight above about 100 is included, which is believed to improve the coating adhesion while maintaining sufficient pot life.

Examples of tertiary amines include trimethylamine, triethylamine, tripropylamine, tributylamine, triisobutylamine, tripentylamine, trihexylamine, triheptylamine, trioctylamine, triethanolamine, tripropanolamine, tributanolamine, triisopropanolamine, tricyclopentylamine, tricyclohexylamine and 4(ethylmethylamino)cyclohexanone.

Colloidal Silica:

In certain applications, colloidal silica may be optionally used in the coating composition. Colloidal silica is commercially available in an aqueous or solvent dispersion of silica particles. Colloidal silica products are normally categorized based on silica particle sizes, particle levels, dispersion media and stabilizing methods.

It is known in the art that colloidal silica can be a very reactive component of a coating composition. The surface of the silica particles are partially covered with hydroxyl functional group (—OH) which can interact with other components of the coating composition, leading to a silanol condensation of the silica.

Colloidal silica can be added into the coating compositions in many different ways resulting in different surface interaction and different coating properties. In one instance, the colloidal silica might be dropped into the aqueous environment before adding the other silane components. In other instances, the colloidal silica might be added after or between other silane components. The process of adding the colloidal silica may affect the stability of the coating solution and properties of the final coating.

Colloidal silica families are supplied under brand names such as the Snowtex® from Nissan Chemical Industries, Ludox® from DuPont Company and Nalco® from Nalco Chemical Co.

The presence of colloidal silica may improve scratch and abrasion resistance of the coating composition. Caution should be exercised since a high quantity of colloidal silica may lead to a rigid and brittle coating which can easily crack. In a preferred embodiment of the current invention, the solid quantity from colloidal silica is from about 5 to 40% by weight of the total coating solid, more preferably from 10 to 25% by weight of the total coating solid.

Optional Coreactants

An organic multi-functional epoxy compound may optionally be added in the present invention for the formation of organic bridge. The presence of organic bridges typically provide more flexibility to a coating. Sometimes, these organic coatings can provide other additional benefits to the coating such as improved tintability or weatherability.

Examples of organic multi-functional epoxies include diglycidyl resorcinol ether, triethylene glycol diglycidyl ether, Bisphenol A diglycidyl ether, 1,4-Butanediol diglycidyl ether, triethylene glycol diglycidyl ether, hexanediol diglycidyl ether, trimethylol ethane triglycidylether, trimethylolpropanetriglycidylether, cyclohexanedimethanoldiglycidylether. Most preferred organic multi-functional epoxies include trimethylol ethane triglycidylether, trimethylolpropanetriglycidylether and, cyclohaxanedimethanoldiglycidylether.

An organosilane with different functional groups optionally may present in the current invention, including the acrylate functional silane, methacrylate functional silane, cyanato functional silanes, halogenated functional silanes, epoxy functional silanes, hydroxyl functional silane, sulfuro functional silane. The presence of an organosilane is to improve the coating flexibility and impart additional special functions. For example, acrylate functional silanes and methacrylate functional silanes allow the formulation of the UV curable coating.

Caution should be exercised in these options to assure that the crosslink density is not severely diminished, which could soften the surface of the coating, or that other physical parameters are not adversely affected, such as the addition of too much flexibility to the material composition of the coating.

Hydrolyzates

It is preferred in the current invention that water is provided in the coating composition at a level sufficient to fully hydrolyze the alkoxy silanes. The completed hydrolysis reactions of the glycidoxy functional silane and tetraalkoxysilane can be described by the following reactions:

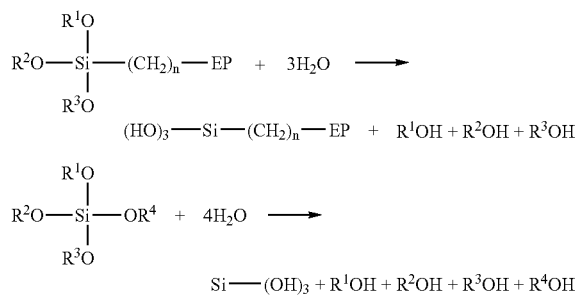

The hydrolyzed products then proceed through a silanol condensation to form the final coating during the application and curing of the coating on a substrate. Hydrolyzate refers to the initial products of the reaction of water with the alkoxy groups of the glycidyl- or glycidoxy-functional silane and tetraalkoxysilane. In a preferred embodiment of the current invention, the silanes are fully hydrolyzed, which means water is provided in adequate quantity to complete the hydrolysis reaction.

Optionally, the glycidyl- or glycidoxy-functional silane and tetraalkoxysilane may be, but are less preferably, partially hydrolyzed in forming compositions of the present invention. Coatings may thus be formed where said glycidyl- or glycidoxy-functional silanes and tetraalkoxysilanes are a hydrolyzed (which includes partial hydrolysis) product of such compounds as are all known and commercially available. Partial hydrolyzate may furtherimprove pot life of the coating composition.

Each of these reagents may be partially hydrolyzed to form the partial hydrolyzate thereof by adding enough water to hydrolyze greater than 20% of the three or four available alkoxy groups, and more preferably having enough water to hydrolyze more than about 40% of these alkoxy groups.

Partial hydrolysis of the siloxane compounds may be performed by adding enough water to hydrolyze an amount of the available alkoxy groups, and an approximately equal amount of a water soluble alcohol, such as ethanol or methanol, may be added to aid solubility as well as stability. A small quantity of an acid may be added to catalyze the hydrolysis reaction. The mixture may be equilibrated, or ripened, for a sufficient period of time to affect the partial hydrolysis. The partial hydrolysis may be performed either by stripping off volatiles, such as the volatile alcohol byproduct of the hydrolysis, or not.

Solvents

If necessary or desired, one or more organic solvents may be added to the coating composition. An effective amount of solvent is normally added to adjust the composition to the proper coating solid and viscosity level, depending on the method of application.

The solvent selection is mainly based on boiling points; volatility; surface tension; and interaction with coating compositions and with substrates surface. A solvent system should be carefully designed to achieve a balance between flow properties, time interval between coating application and achieving a tack-free coating, resistance to haze and similar considerations. Certain solvents with high boiling points might be added in an effective amount into the coating composition to increase resistance to haze caused by the condensation of moisture onto the coated surface. Certain solvents have strong solvency with the substrate and may be added in an effective amount to micro-etch the substrate surface and further improve adhesion.

Suitable solvents include many of the solvents commonly used for silanes, and the like, including, but not limited to alcohols (e.g., methanol, ethanol, 1-propanol, 2-propanol, 2-butanol, etc.), halogenated hydrocarbons (such as, but are not limited to, dichloromethane, trichloromethane, 1,1,1-trichloroethane), ketones (e.g., methyethyl ketone, methylpropyl ketone, ethylethyl ketone), polar solvents, aromatic hydrocarbon solvents (e.g., toluene) and glycol ethers (e.g., 2-butoxyethanol, and 1-methoxy-2-propanol), and the like.

In one preferred embodiment of the current invention, the total quantity of solvents added into the coating composition is sufficient to form a coating solution with coating solid from about 1 to 40% by weight, and more preferably from about 10 to 35% by weight of the total coating solution.

Leveling Agents

The composition preferably contains a surfactant that is used as a leveling agent for regulating film thickness and enhancing the cosmetic appearance of the coated article. An example is Fluorad FC-430, a fluoroester (e.g., fluorinated alkyl ester or fluoroaliphatic polymeric ester) fluorosurfactant that is manufactured by the 3M Corporation, St. Paul, Minn. Another example is FSO-100, which is manufactured by the DuPont Corporation. The examples set forth below are intended for illustrative purposes and should not be construed as limiting the invention in any way. A flow control agent such as a polydimethylsiloxane or a derivative thereof, particularly those having ethyleneoxide side chains, may be used to improve the flow and leveling of the coating to obtain a more uniform film thickness as well as to improve the cosmetic appearance of the coated article. An example is BYK 333, a polydimethylsiloxane that is manufactured by BYK-Chemie USA, Wallingford, Conn.

In a preferred embodiment of the current invention, the quantity of a leveling agent added into the coating composition is from 0.01 to 3% by weight of the total coating solution, more preferably from 0.03 to 1.5% by weight of the total coating solution.

Catalysts

In some applications, a catalyst may be added into the coating composition. The addition of a catalyst can affect the properties of the coating such as the abrasion resistance, cosmetics, and tintability.

There are numerous classes of catalysts, which may also be used to improve the speed or manner of crosslinking and curing of the polymerizable groups. For example, perfluorinated alkylsulfonyl methides (and their amide counterparts) are known to be active catalysts for the silane condensation and for epoxy polymerization. Photoinitators such as the onium catalysts with complex fluorinated anions (e.g., triphenylsulfonium hexafluoroantimonate, diphenyl iodonium tetrafluoroborate, diphenyl, phenylthiophenylsulfonium hexafluoroantimonate) are known photoinitators for both the epoxy polymerization and the silane condensation reactions.

The level of the catalyst incorporated is normally small but sufficient ranging from about 0.1 to 10% by weight of the total coating solids of the composition, and more preferably from 0.2 to 2% by weight of the total coating solid.

The coatings produced from the compositions in this invention display a potentially wide range of properties and benefits, including but not limited to:

- improved adherence to polymeric substrates, especially to polycarbonate lens material, without the use of primers, adhesives, or surface treatment;
- high abrasion resistance (e.g., as measured by a Bayer test);
- good transparency and low color content;
- strong solvent resistance;
- ease of manufacture and low cost of the synthetic procedure;
- consistent coating properties;
- improved stability against gelation, longer pot life, and no need of refrigeration;
- simplicity of use in a single step reaction or coating process;
- strengthened base for other post processes such as anti-reflection coating Some or all of these benefits may be obtained in specific compositions and polymers made according to the present teachings. In addition, some unique benefits have been found with regard to the level and quality of abrasion resistance provided on ophthalmic lenses using these compositions.

General Process for Application of Coatings to Lenses

As the coatings of this invention tend to be somewhat reactive at room temperature, as a general precaution and good practice, the coatings should be stored at about 0° F. until they are to be applied. Prior to application, the coating solution is warmed to the appropriate temperature for application, such as room temperature. The appropriate temperature is determined according to the solvent used, the desired drying rate, and the desired coating characteristics. Typical coating temperatures are from 30 to 80° F.

The coating is typically applied by dip coating, although spin coating or any other process compatible with the surface to be treated is acceptable. The coated article, such as an ophthalmic lens, is then placed into a forced air oven at an appropriately elevated temperature, usually from 120 to 200° F., preferably from 170 to 190° F. The lens is maintained for an amount of time sufficient to provide the degree of initial cure desired in the article when it is removed from the oven. With thermal curing (as compared to photoinitiated cure or highly catalyzed thermal curing), the lens may be treated for a few minutes to a few hours, typically from 15 minutes to 1 hour. Alternatively, rather than using a convection oven, this initial cure may be effected by radiant heat on exposure to a source of infrared light.

After this initial temperature treatment, the lens should be transferred to a second heating environment such as another forced air oven at a temperature below the glass transition temperature of the substrate for 2 to 6 hours to fully cure the coating. Preferably the second oven temperature is between 220 and 280° F. for polycarbonate substrates.

In the field of ophthalmic or sports lenses, a variety of different surface properties may be desired from a single lens. For example, abrasion resistance is quite important for the longevity of the lens, as scratches or other surface damage can be annoying, unattractive or even dangerous if they cause structural flaws in the lens. Reduced haze in the lens is also desirable for improved quality of vision.

Abrasion Resistance Testing

Abrasion resistance of a coating on a substrate can be tested by a number of quantitative methods including the Taber Test (ASTM D-4060), The Tumble Test(ASTM F735-81).

Within ophthalmic industry, the Bayer ratio test for abrasion resistance is widely used. The test compares the abraded or haze level of the test lens with a standard lens made from poly(diethylene glycol bis-allyl carbonate), widely recognized as a CR39 lens. One test and one standard lenses are placed in lens holders and positioned in a cradle which allows a bed of an abrasive material to lay on the top of the lenses. Next, 500 g of an alumina zirconia grit such as that from Saint-Gobain Industrial Ceramics Co. is used for the test. The lenses are then subjected to a total of 1200 4-inch strokes.

Both lenses used in the test are to be of a specific base curve, diameter, thickness, and power. The lenses are also conditioned properly prior to the test. As the damage done to a surface increases, the haze increases. The Bayer ratio, therefore, shows the relative abrasion resistance between the test specimen and the standard lens material as computed by the following formulation:

$$\text{Bayer Ratio} = \frac{[H_{tf} - H_{ti}]}{[H_{sf} - H_{si}]}$$

where $H_{ti}$ and $H_{tf}$ are the haze levels of the test lens before and after the test;

and $H_{si}$ and $H_{sf}$ are the haze levels of the standard lens before and after the test.

Haze is often measured by a haze meter, in which collimated light is directed against a surface, and the intensity of the light is measured (often as a percent of scattered light).

Higher Bayer ratios indicate greater degrees of abrasion resistance. Values of the Bayer ratio between 2 and 4 are a significant improvement over polymerized di(ethylene glycol) bis(allyl carbonate), which is the industry standard. HBayerhigher ratios, however, are only desirable as long as the other properties (moisture sensitivity, adhesion, coloration, flexibility, etc.) are not adversely affected.

Adhesion Testing

Adhesion of the coating the substrate is tested by crosshatch adhesion method whereby a crosshatch pattern of 100-1 mm×1 mm squares is scribed on the coating surface using a Cross-hatch blade. Tape (Scotch Tape 600, 3M Co.) is applied on the pattern and pulled away for 5 times. Visible peeling of the coating where the tape is applied is considered adhesion failure. Initial adhesion of the coating is tested after the coating is cured and conditioned at room conditions for a day. For coated lenses used in ophthalmic industry, the coating has to go through tinting process in certain circumstances. Post-tint adhesion, hence, is important. The coated and cured coating is immersed in almost boiling BPI Black dye solution (1% Transmission, BPI Co.) for 30 minutes and then rinsed with DI water. Adhesion as described above is then tested to provide post-tint adhesion.

EXAMPLES

Example 1

A coating solution is prepared by slowly adding a) 6 g of 1M hydrochloric acid solution, b) 50.2 g ethanol, c) 204 g ethyleneglycoldimethylether, d) 135.7 g 3-glycidoxypropyltrimethoxysilane and e) 80.5 g of tetraethoxysilane into f) 108 g of deionized water in the listed order while mixing. The solution is mixed for 5 hours and a clear solution is obtained.

Example 1A 1.0 g of Byk333 10% solution in ethyleneglycoldimethylether and 1.0 g of triethanolamine are added into 100 g of the solution in Example 1. The solution is then stirred overnight to obtain a final coating solution.

Example 1B 1.0 g of Byk333 10% solution in ethyleneglycoldimethylether and 1.0 g of trihexylamine are added into 100 g of the solution in Example 1. The solution is then stirred overnight to obtain a final coating solution.

Example 2

In Example 2, the ingredients in Example 1 were added in the same proportions in the order of f), a), d) and e). The solution was stirred for 5 hours until a clear solution was obtained. Then b) and c) were added into the solution and the solution was kept stirred for 1 more hour.

Example 2A 1.0 g of Byk333 10% solution in ethyleneglycoldimethylether and 1.1 g of tripentylmethyolamine are added into 100 g of the solution in Example 2. The solution is then stirred overnight to obtain a final coating solution.

Example 2B 1.0 g of Byk333 10% solution in ethyleneglycoldimethylether and 1.2 g of trihexylamine are added into 100 g of the solution in Example 2. The solution is then stirred overnight to obtain a final coating solution.

Example 3

A coating solution is prepared by slowly adding a) 6 g of 1M acetic acid solution, b) 50.2 g ethanol, c) 204 g ethyleneglycoldimethylether, d) 135.7 g 2-glycidoxyethylmethyltriethoxysilane and e) 80.5 g of tetramethoxysilane into f) 108 g of deionized water in the listed order while mixing. The solution is mixed for 5 hours and a clear solution is obtained.

Example 3A 1.0 g of Byk333 10% solution in ethyleneglycoldimethylether and 1.0 g of tripentylmethanolamine are added into 100 g of the solution in Example 3. The solution is then stirred overnight to obtain a final coating solution.

Example 3B 1.0 g of Byk333 10% solution in ethyleneglycoldimethylether and 1.0 g of triheptylamine are added into 100 g of the solution in Example 3. The solution is then stirred overnight to obtain a final coating solution.

Example 4

A coating solution is prepared by mixing 84.8 g of 3-glycidoxypropyltrimethoxysilane, 146.4 g of tetraethoxysilane, 6.0 g of cyclohexandimethanoldiglycidylether, 6.0 g of itaconic acid, 206.2 g of methyl ethyl ketone, 48.0 g of diacetone alcohol and 100 g of water. The solution is stirred overnight to hydrolyze all of the silane groups. After then 0.6 g of the surfactant Byk333 and 6.0 g of trihexylamine is mixed into the solution. The solution is then stirred overnight to obtain a final coating solution.

Comparative Example 5

1 g of hydrochloric acid, 34 g of ethyleneglycoldimethylether, 22.6 g of glycidoxypropyltrimethoxysilane and 28.4 g of tetraethoxysilane, solution 3.3% were added into 18 g of deionized water in the listed order. The mixture was mixed overnight to obtain a homogenous and clear coating solution.

The coating solutions produced from Examples 1A, 1B, 2A, 2B, 3A, 3B, 4 and 5 were all mixed at room temperature and allowed to stand and react at room temperature for twenty-four hours prior to use.

The samples were then applied onto polycarbonate ophthalmic lenses using the flow coating process. The coatings were cured at 180 F in oven for 30 minutes, following 4 hours at 265 F. Coating from Example 5 peeled of from the lens substrate even before testing. The testing results were summarized as follows:

| Example | Initial Percent Haze | Initial adhesion | Post Tint Adhesion | Bayer Ratio |
|---|---|---|---|---|
| 1A | 0.12 | passed | Passed after 15 minutes | 5.32 |
| 1B | 0.25 | passed | Passed after 10 minutes | 4.26 |
| 2A | 0.15 | passed | Passed after 20 minutes | 4.39 |
| 2B | 0.14 | passed | Passed after 10 minutes | 3.98 |
| 3A | 0.25 | passed | Passed after 10 minutes | 4.16 |
| 3B | 0.30 | passed | Passed after 10 minutes | 3.51 |
| 4 | 0.11 | passed | Passed after 10 minutes | 4.28 |
| Comparative 5 | 0.19 | Failed | Not tested | Coating peeled off |

The procedure used to check for pot life in all of these examples was as follows. The materials were added at room temperature in the order described while stirring well between each addition. A small aliquot of each sample was stored in a refrigerator and another aliquot stored at room temperature. The remainder was stored in the freezer. Each sample was checked for gelation for each day. One day after the preparation, the room temperature stored samples were squirted onto a pair of lenses, cured as shown in Example 1A. No samples gelled at room temperature after one week. Coating produced from sample 5 peeled from the lens before testing. Solution 1A gelled after 10 days. Solution sample 2 gelled after 1 months and the rest of the sample didn't gel after two months.

The coating is typically applied by dip coating, although spin coating or any other process compatible with the surface to be treated is acceptable. The coated article, such as an ophthalmic lens, is then placed into a forced air oven at an appropriately elevated temperature, usually from 120 to 200° F., preferably from 170 to 190° F. The lens is maintained for an amount of time sufficient to provide the degree of initial cure desired in the article when it is removed from the oven. With thermal curing (as compared to photoinitiated cure or highly catalyzed thermal curing), the lens may be treated for a few minutes to a few hours, typically from 15 minutes to 1 hour. Alternatively, rather than using a convection oven, this initial cure may be effected by radiant heat on exposure to a source of infrared light. After this initial temperature treatment, the lenses should be transferred immediately to a second heating environment such as another forced air oven at a temperature above 250° F. Preferably the second oven temperature is between 260 and 270° F.

The compositions of the present invention have been described primarily for use with the coating of optical elements such as ophthalmic lenses, but may also be used to provide abrasion resistance to many other substrates, such as, but not limited to, flat glass, polymeric film, light filters, countertops, finger nails, CRT screens, LED screens, LED panels, furniture and the like.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A coating composition for use on a primer-less optical article comprising:
   a. a glycidyl- or glycidoxy-functional silane of the formula:

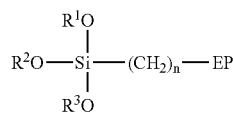

wherein $R^1$, $R^2$, and $R^3$ are independently selected from group consisting of hydrogen, aliphatic groups and aromatic groups which complete a siloxane on the silicon (Si) atom;
   n is an integer from 1 to 4, and;
   EP represents a glycidyl (e.g., glycidoxy) group;
   b. a tetraalkoxylsilane of the formula:

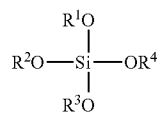

wherein $R^1$, $R^2$, $R^3$ and $R^4$ are independently selected from the group consisting of hydrogen, aliphatic groups and aromatic groups which complete a siloxane on the silicon (Si) atom; and
   c. a tertiary amine comprising triethanolomine the amount of glycidyl- or glycidoxy-functional silane is from about 30 to 70% by weight of the total coating solid, the level of tetraalkoxysilane is from about 30 to 70% by weight of the total coating solid and the total level of triethanolamine is from about 0.1 to 5% by weight of the total coating solid.

2. The coating composition of claim 1 further comprising a multi-functional epoxy compound.

3. The coating composition of claim 1 further comprising multi-functional epoxy colloidal silica.

4. The coating composition of claim 1 wherein an effective amount of one or more solvents is added to form a coating solution having a solid level from about 1 to 40% by Weight.

5. The coating composition of claim 1 wherein the amount of said triethanolamine added to said coating composition is between about 0.05% and 3.0% of the total coating by weight.

6. The coating composition of claim 1 wherein an coating composition is disposed on at least one surface of an organic surface of an article.

7. The coating composition of claim 6 wherein organic glass surface of the article is a substrate comprising a polymeric ophthalmic lens.

8. The coating composition of claim 7 wherein the polymeric opthalmic lens comprises a polycarbonate ophthalmic lens.

9. The coating composition of claim 1 wherein a Bayer ratio of the coating is higher than 4.0.

10. The coating composition of claim wherein the glycidyl- or glycidoxy-functional silane and tetraalkoxysilane are mixed with solvents and water.

11. The coating composition of claim 1 wherein $R^1$, $R^2$ and $R^3$ are independently selected from the group consisting of alkyl groups, benzyl groups or phenyl groups.

12. The coating composition of claim 1 wherein $R^1$, $R^2$ and $R^3$ are independently selected from the group consisting of unsubstituted alkyl groups.

13. The coating composition of claim 1 wherein $R^1$, $R^2$ and $R^3$ of the glycidyl- or glycidoxy-functional silane of the formula are independently selected from the group consisting of alkyl, benzyl and phenyl groups; and $R^1$, $R^2$, $R^3$, and $R^4$ of the tetraalkoxysilane of the formula are independently selected from the group consisting of alkyl, benzyl, and phenyl groups.

14. The coating composition of claim 1 wherein $R^1$, $R^2$ and $R^3$ of the glycidyl- or glycidoxy-functional silane of the formula are independently selected from the group consisting of unsubstituted alkyl groups, and $R^1$, $R^2$, $R^3$, and $R^4$ of the tetraalkoxysilane of the formula are independently selected from the group consisting of unsubstituted alkyl groups.

* * * * *